United States Patent
Khan et al.

(10) Patent No.: US 12,457,264 B2
(45) Date of Patent: Oct. 28, 2025

(54) SYSTEMS AND METHODS FOR MIGRATION OF DISTRIBUTED LEDGER NODE ENVIRONMENTS

(71) Applicant: Verizon Patent and Licensing Inc., Basking Ridge, NJ (US)

(72) Inventors: Ahmed A. Khan, Plano, TX (US); Abdul Raheem, Irving, TX (US); David Szol, Owasso, OK (US); Mohammed Alsadi, Redmond, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 269 days.

(21) Appl. No.: 18/321,112

(22) Filed: May 22, 2023

(65) Prior Publication Data

US 2024/0396966 A1 Nov. 28, 2024

(51) Int. Cl.
| | |
|---|---|
| *G06F 15/16* | (2006.01) |
| *G06F 9/54* | (2006.01) |
| *H04L 29/06* | (2006.01) |
| *H04L 67/1061* | (2022.01) |
| *H04L 67/1095* | (2022.01) |

(52) U.S. Cl.
CPC ...... *H04L 67/1095* (2013.01); *H04L 67/1065* (2013.01)

(58) Field of Classification Search
CPC ............. H04L 67/1095; H04L 67/1065; H04L 63/123
USPC ........................................................ 709/203
See application file for complete search history.

(56) References Cited

U.S. PATENT DOCUMENTS

| | | | | |
|---|---|---|---|---|
| 2006/0031594 | A1* | 2/2006 | Kodama | G06F 3/0619 710/5 |
| 2018/0323963 | A1* | 11/2018 | Stollman | H04L 9/3239 |
| 2019/0102409 | A1* | 4/2019 | Shi | H04L 67/565 |
| 2020/0142965 | A1* | 5/2020 | Weldemariam | G06F 16/2379 |
| 2021/0089497 | A1* | 3/2021 | Zhou | G06F 16/152 |
| 2021/0119807 | A1* | 4/2021 | Chen | H04L 9/3242 |
| 2021/0374112 | A1* | 12/2021 | Nagai | G06F 16/214 |

(Continued)

OTHER PUBLICATIONS

M. Zhang, Q. Qu, L. Ning and J. Fan, "On Time-Aware Cross-Blockchain Data Migration," in Tsinghua Science and Technology, vol. 29, No. 6, pp. 1810-1820, Dec. 2024, doi: 10.26599/TST.2023. 9010136 (Year: 2024).*

(Continued)

*Primary Examiner* — Hamza N Algibhah

(57) ABSTRACT

A system described herein may receive ledger information based on contents of a distributed ledger maintained by a first set of nodes, receive communication information associated with the first set of nodes, and establish a second set of nodes. Establishing the second set of nodes may includes providing the ledger information to the second set of nodes, providing the communication information, associated with the first set of nodes, to the second set of nodes, and maintaining information that the second set of nodes are in a first state. After establishing the second set of nodes, the system may obtain sync information from the first set of nodes, provide the sync information to the second set of nodes, and based on providing the sync information to the second set of nodes, maintain information that the second set of nodes are in a second state.

20 Claims, 16 Drawing Sheets

(56) References Cited

U.S. PATENT DOCUMENTS

| | | | |
|---|---|---|---|
| 2022/0050852 A1* | 2/2022 | Nakajima | H04L 63/123 |
| 2022/0215386 A1* | 7/2022 | Yonekura | H04L 9/50 |
| 2022/0229577 A1* | 7/2022 | Liu | G06F 21/64 |
| 2022/0300488 A1* | 9/2022 | Marteau | G06F 16/2379 |
| 2024/0168787 A1* | 5/2024 | Gunasekaran | G06F 9/45558 |
| 2024/0305468 A1* | 9/2024 | Khan | H04L 9/3242 |

OTHER PUBLICATIONS

TDX Migration TD Design Guide Rev 0.8.9, Mar. 2023 (Year: 2023).*

* cited by examiner

SYSTEMS AND METHODS FOR MIGRATION OF DISTRIBUTED LEDGER NODE ENVIRONMENTS

BACKGROUND

Distributed ledgers, such as blockchains, provide for the decentralized and secure storage of data. Distributed ledgers may further provide for the immutability of recorded data, as data may not be altered once recorded to a distributed ledger. Various nodes, which may be implemented by geographically diverse and/or otherwise separate hardware resources, may maintain the distributed ledger. Wireless networks or other systems may make use of virtualized environments, in which nodes of a distributed ledger are implemented by virtual machines, cloud systems, bare metal devices, etc.

DETAILED DESCRIPTION OF EXAMPLE EMBODIMENTS

The following detailed description refers to the accompanying drawings. The same reference numbers in different drawings may identify the same or similar elements.

Distributed ledgers, such as blockchains, may provide for a decentralized, immutable mechanism by which data may be recorded and/or retrieved. Distributed ledgers may be implemented by geographically diverse and/or otherwise separate hardware resources, such as virtual machines, cloud systems, bare metal devices, etc. An entity maintaining one or more nodes may wish to migrate the nodes from one node environment (e.g., one cloud system, one set of virtual machines, one set of hardware resources, etc.) to another node environment. For example, a set of hardware resources on which the nodes are currently implemented (e.g., a "source" set of hardware resources) may be overloaded or may be unable to deliver at least a threshold level of performance, a set of hardware resources on which the nodes are to be migrated (e.g., a "target" set of hardware resources) may be an upgraded set of hardware resources, the source set of hardware resources may be subject to a maintenance or update procedure, etc. Embodiments described herein provide for techniques by which such migration may be provided in a seamless manner that does not disrupt the operation of the nodes.

Figure 1:
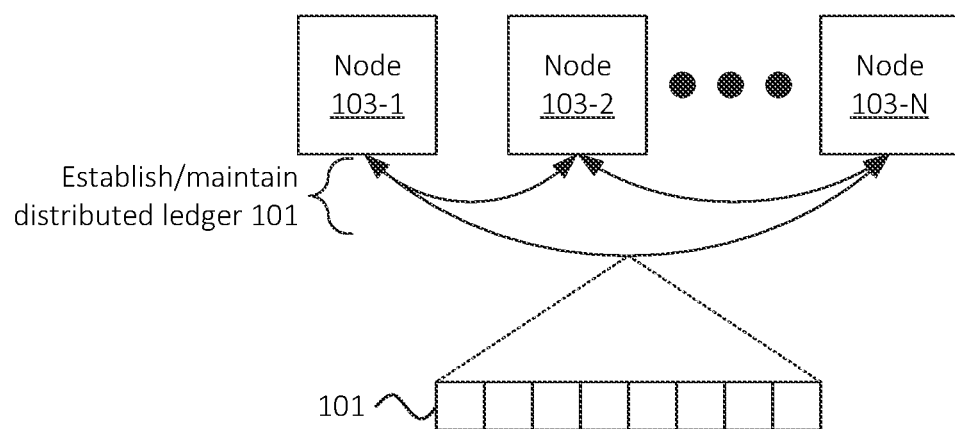
FIGS. 1, 2A, and 2B illustrate concepts associated with distributed ledgers.

As shown in FIG. 1, distributed ledger 101 may be established and/or maintained by one or more nodes 103 (e.g., nodes 103-1 through 103-N). Nodes 103 may also maintain a "world state" associated with distributed ledger 101. For example, distributed ledger 101 may include values associated with particular variables, attributes, etc. Since distributed ledger 101 is immutable, multiple versions of the same attribute may be present in distributed ledger 101. The world state associated with distributed ledger 101 may include the most up-to-date version (or versions) of one or more of such attributes. Nodes 103 may access the world state when receiving interactions, instructions, etc. to access or modify values that have been previously recorded to distributed ledger 101. As discussed below, nodes 103 may be implemented in a containerized environment, in which various containers, cloud systems, and/or other virtualized environments implement one or more nodes 103.

Figure 2A:
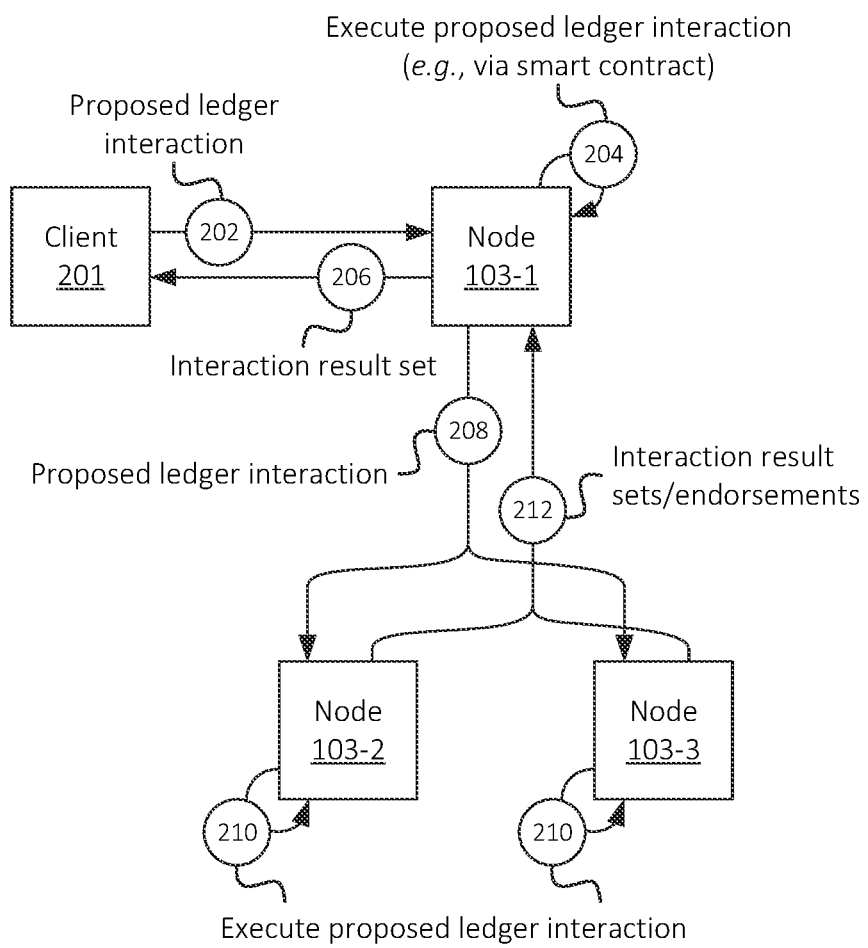
Figure 2B:
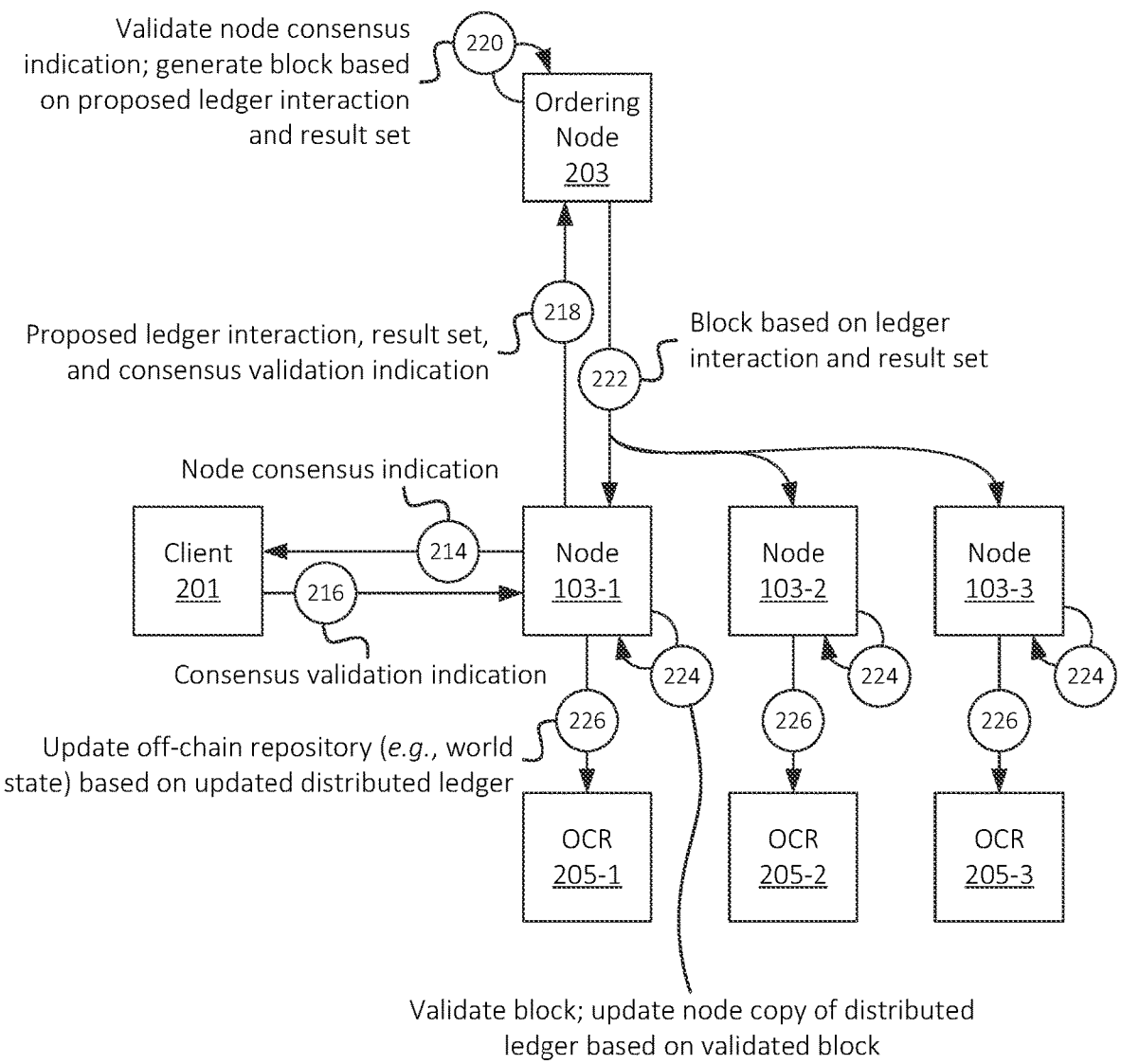

FIGS. 2A and 2B illustrate an example of modifying distributed ledger 101 and/or world state information based on an interaction with distributed ledger 101. As shown, a particular node 103-1 may receive (at 202) a proposed ledger interaction (e.g., a request to access or modify distributed ledger 101) from a particular source, such as client 201 (e.g., which may be or may be implemented by a device or system that has access to node 103-1, such as a device or system that has authentication credentials, locator information, etc. via which client 201 is able to interact with node 103-1). In some embodiments, node 103-1 may receive the proposed ledger interaction from a distributed ledger management system (e.g., which may receive the proposed ledger interaction from client 201 and may select node 103-1 out of a group of nodes 103, such as a group of nodes associated with the same channel in a channel-based ledger system, such as the Hyperledger Fabric), an ordering node, or other suitable device or system.

Client 201 may be, for example, an entity associated with distributed ledger 101 (e.g., may be associated with an address, a "wallet," a decentralized application ("dApp"), etc.). In this example, assume that client 201 is authorized to initiate, request, etc. the proposed ledger interaction, which may include the modification of one or more values of one or more attributes that are currently associated with distributed ledger 101, the addition of one or more attributes to distributed ledger 101, or other suitable interactions. In other examples, node 103-1 and/or some other device or system may verify that client 201 is authorized to initiate the proposed ledger interaction. The proposed ledger interactions may be specified in one or more smart contracts, as specified by access parameters associated with distributed ledger 101.

In some embodiments, the proposed ledger interaction (received at 202) may indicate a smart contract recorded to distributed ledger 101, which may specify one or more inputs (e.g., types of inputs, quantity of inputs, and/or other input parameters), and may also include actions to take with respect to the inputs in order to generate one or more outputs (sometimes referred to as "chaincode"). For example, the proposed ledger interaction may specify a particular smart contract (e.g., an address associated with distributed ledger

101 with which the smart contract is associated) and one or more input values according to input parameters specified by the particular smart contract. In some examples, the proposed ledger interaction may refer to one or more values that have previously been recorded to distributed ledger 101 (and thus reflected in world state information associated with distributed ledger 101), such as an interaction that increments or decrements previously recorded values or performs other computations based on previously recorded values.

Node 103-1 may execute (at 204) the proposed ledger interaction, which may include accessing the one or more values that were previously recorded to distributed ledger 101. In order to determine the one or more values referred to in the proposed ledger interaction, node 103-1 may access world state information, maintained by node 103-1, to determine such values. Such access may include checking a local cache and/or accessing, via a network, a remote system (e.g., a "cloud" system, a containerized system, etc.) associated with node 103-1 that maintains the world state associated with distributed ledger 101. The execution (at 204) may be a "simulation" of the proposed ledger interaction, inasmuch as the execution and of the proposed ledger interaction and the ensuing result may not yet be recorded to distributed ledger 101. The interaction may become "final" or "committed" based on validation by one or more other nodes. The result may include a "read-write set," which may include the values of the one or more attributes that were accessed (e.g., the values based on which the interaction was performed), as well as the resulting values after execution of the proposed interaction.

Node 103-1 may provide (at 206) the result set (e.g., the read-write set) based on executing (at 204) the proposed interaction to client 201. Client 201 may maintain the result set to, for example, verify and/or to provide approval of the result set before the result set is committed to distributed ledger 101. Node 103-1 may also provide (at 208) the proposed ledger interaction to one or more other nodes 103 associated with distributed ledger 101, such as nodes 103-2 and 103-3. In some embodiments, node 103-1 may provide (at 208) the result set generated by node 103-1 to nodes 103-2 and 103-3. Nodes 103-1 through 103-3 may all be associated with the same channel, nodes 103-2 and 103-3 may be specified by the smart contract as validators, and/or nodes 103-2 and 103-3 may otherwise be identified by node 103-1 or an associated distributed ledger management system as nodes that should validate, endorse, etc. the execution and result of the proposed interaction.

As similarly discussed with respect to node 103-1, nodes 103-2 and 103-3 may execute (at 210), and/or simulate the execution of, the proposed interaction. Accordingly, nodes 103-2 and 103-3 may access one or more values that were previously recorded to distributed ledger 101 using world state information maintained by nodes 103-2 and 103-3. Nodes 103-2 and 103-3 may validate, verify, etc. the result set generated by node 103-1 by comparing the result set with respective result sets generated by nodes 103-2 and 103-3. Nodes 103-2 and 103-3 may respond (at 212) to node 103-1 with respective result sets generated by nodes 103-2 and 103-3, and/or may respond with an indication, endorsement, etc. (e.g., which may be respectively signed by nodes 103-2 and 103-3) that the result set generated by node 103-1 is valid. Once node 103-1 has received endorsements from at least a threshold quantity of other nodes (e.g., from nodes 103-2 and 103-3, in this example), node 103-1 may determine that a consensus has been reached with respect to the result set for the proposed interaction.

As shown in FIG. 2B, node 103-1 may accordingly provide (at 214), to client 201, an indication that consensus for the result set (provided at 206) has been reached. In some embodiments, client 201 may validate the consensus (e.g., by evaluating signatures of nodes 103-2 and 103-3) and/or may verify the result set (e.g., by itself executing the proposed interaction). Client 201 may provide (at 216), to node 103-1, an indication that client 201 has validated the consensus and/or has verified the result set. In some embodiments, the consensus validation indication may be signed by client 201, thus securely authenticating the validation by client 201.

Node 103-1 may provide (at 218) the result set, along with the consensus validation indication and the proposed ledger interaction, to ordering node 203. Ordering node 203 may be a node, associated with the same channel as nodes 103-1 through 103-3, that validates (at 220) the consensus validation indication (e.g., validates signatures associated with client 201 and/or nodes 103-1 through 103-3) and generates a block, to be recorded to distributed ledger 101, that includes information regarding the ledger interaction. Such information may include an identifier of client 201 (e.g., an address, wallet identifier, etc.), identifiers of nodes 103-1 through 103-3 that participated in generating and/or validating the result set based on the ledger interaction, smart contract inputs provided by client 201, the consensus validation indication, one or more timestamps of the above operations and/or other events, and/or other suitable information associated with the ledger interaction. In some embodiments, the block may be signed by ordering node 203, thus securely authenticating the block creation by ordering node 203. At this point, the ledger interaction may no longer be a "proposed" ledger interaction, as the interaction has been finalized, committed, etc. by ordering node 203. In some implementations, nodes 103-1 through 103-3 may be referred to as "peers," to indicate that such nodes 103-1 through 103-3 are distinct from ordering node 203 (e.g., ordering node 203 performs one or more different operations from the peers).

Ordering node 203 may propagate (at 222) the signed block, including information regarding the finalized ledger interaction initiated by client 201, to nodes 103-1 through 103-3 and/or other nodes associated with the same channel. Nodes 103-1 through 103-3 may validate (at 224) the block, which may include verifying the signature of ordering node 203, and may accordingly update a respective copy of distributed ledger 101 as maintained by each one of nodes 103-1 through 103-3. Nodes 103-1 through 103-3 may maintain respective independent copies of distributed ledger 101, thus providing an element of decentralization to distributed ledger 101. As such, when adding the block (received at 222), nodes 103-1 through 103-3 may continue to maintain separate copies of the same distributed ledger 101, including the information regarding the finalized ledger interaction.

Nodes 103-1 through 103-3 may also maintain off-chain respective repositories 205 (e.g., off-chain repositories 205-1 through 205-3), which may be used to maintain world state information. For example, as discussed above, world state information may include a portion of the information stored in distributed ledger 101, such as the latest version of some or all of the attributes for which information has been recorded to distributed ledger 101. Nodes 103-1 through 103-3 may accordingly update (at 226) respective copies of world state information based on the received block. For example, in the event that the block includes a change in the value of a particular attribute, nodes 103-1 through 103-3 may update world state information (e.g., as respectively stored in off-chain repositories 205-1 through 205-3) to replace a previous value of the attribute (e.g., a previous version of the attribute) with the newly received value of the particular attribute.

Figure 3:
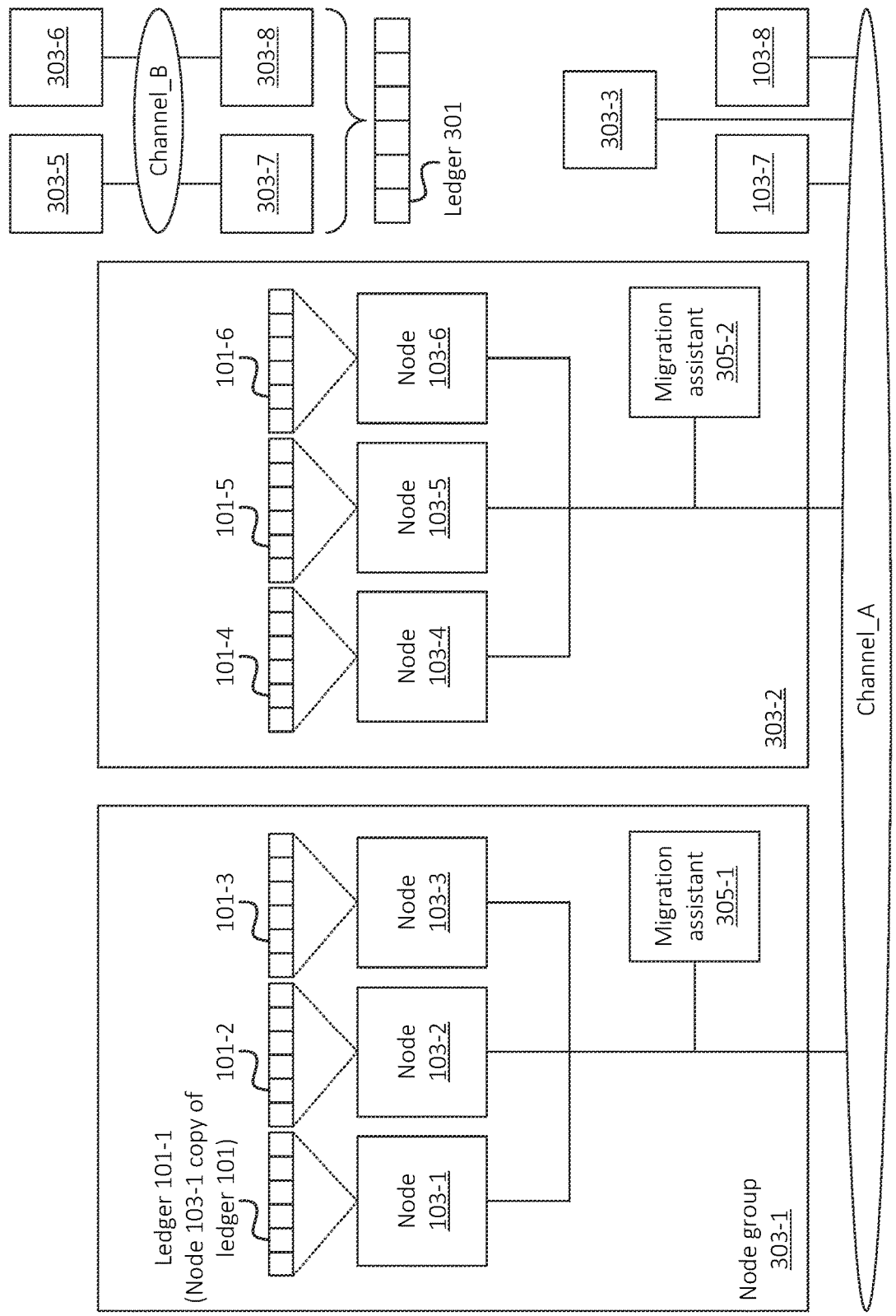
FIG. 3 illustrates an example of nodes and/or node groups that may maintain distributed ledgers associated with different channels, in accordance with some embodiments.

FIG. 3 illustrates an example arrangement of various devices or systems described herein. For example, as shown, various nodes 103 may be associated with various channels, where a "channel" refers to a set of nodes 103 that communicate with each other (e.g., as similarly discussed above) in order to maintain a distinct distributed ledger 101. For example, Channel_A may be associated with a first set of nodes 103-1 through 103-3, which may maintain a first distributed ledger 101, while Channel_B may be associated with a second set of nodes 103-5 through 103-8, which may maintain a second distributed ledger (e.g., distributed ledger 301). Each respective node 103 of Channel_A may maintain a local copy of distributed ledger 101 (e.g., in an integrated or otherwise accessible set of storage resources associated with node 103). For example, node 103-1 may maintain local copy 101-1, node 103-2 may maintain local copy 101-2, and so on. In some embodiments, nodes 103 of node groups 303 may include peers, ordering nodes, and/or other types or roles of nodes. For simplicity, the various node types, roles, etc. are simply referred to herein as nodes 103.

In accordance with some embodiments, particular sets of nodes 103 may be arranged into node groups 303. Additionally, as shown, individual nodes 103 (e.g., nodes 103-8 and 103-8) that are not associated with respective node groups 303 may also be associated with a given channel. Each node group 303 may be implemented at a particular set of hardware resources, such as one or more bare metal machines, one or more virtualized environments, one or more containers, one or more cloud systems, etc. For example, node group 303-1 may be implemented at a first set of hardware resources, node group 303-2 may be implemented at a second set of hardware resources, node group 303-3 may be implemented at a third set of hardware resources, and so on. In some scenarios, the same set of hardware resources may implement multiple nodes 103 or node groups 303. In some embodiments, a particular node group 303 may be associated with a given entity, organization, etc., such that different node groups 303 are associated with different entities, organizations, etc. In this sense, such an entity or organization may be able to control or otherwise manage the implementation of respective nodes 103 (e.g., at particular hardware resources associated with the entity or organization).

Situations may occur in which such an entity, organization, etc. wishes to migrate one or more nodes 103 or node groups 303 from one set of hardware resources (e.g., a source set of hardware resources) to a different set of hardware resources (e.g., a target set of hardware resources). For example, the source set of hardware resources may be overloaded or may be unable to deliver at least a threshold level of performance, the target set of hardware resources may be an upgraded set of hardware resources, the source set of hardware resources may be subject to a maintenance or update procedure, etc. In accordance with embodiments described herein, a full node group 303 may be able to be migrated from a source set of hardware resources to a target set of hardware resources in a seamless manner, such that other nodes 103 or node groups 303 are able to maintain communication with the migrated node group 303. Further, the migrated node group 303 may be kept up-to-date, such that interactions with distributed ledger 101 that are performed during the migration procedure are accounted for, and any potential gaps or desynchronization issues that may occur during the migration procedure are clearly indicated to clients accessing the migrated node group 303. In this manner, the risk of a client receiving incorrect or incomplete distributed ledger information is minimized or eliminated. Further, the migration procedure described herein may be a simplified migration procedure that provides ease of use to entities wishing to perform such migrations, thereby reducing costs or other burdens on such entities. In accordance with some embodiments, one or more node groups 303 may include or may be associated with respective migration assistants 305, which may perform one or more operations described herein to facilitate the migration of node groups 303 from a source set of hardware resources to a target set of hardware resources.

Figure 4:
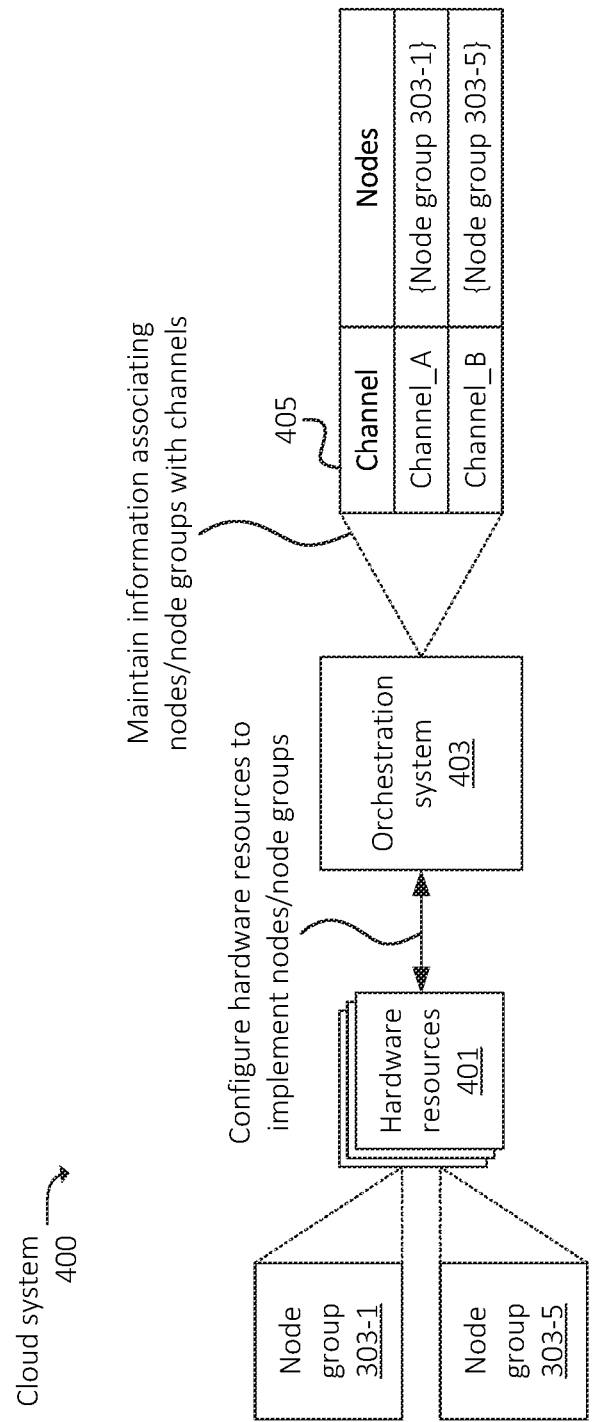
FIG. 4 illustrates an example cloud system on which different node groups may be implemented, in accordance with some embodiments.

FIG. 4 illustrates an example set of hardware resources 401 that may be used to implement one or more node groups 303. In this example, node groups 303-1 and 303-5 are implemented hardware resources 401, which may be implemented by, or may implement, a particular bare metal machine, a particular cloud system, a particular containerized environment, or the like. In the examples described herein, each respective set of hardware resources 401 is associated with a particular cloud system 400, which may include a co-located and/or a geographically distributed set of hardware resources that may be logically referred to as a particular set of hardware resources 401.

Hardware resources 401 may be configured by, managed by, or otherwise associated with orchestration system 403. Orchestration system 403 may be, may include, may be implemented by, and/or may otherwise be associated with a device or system that installs containers on hardware resources 401 (e.g., containers that may be used to implement particular nodes 103), provisions or creates virtual machines on hardware resources 401 (e.g., virtual machines that host particular nodes 103), and/or otherwise manages or configures hardware resources 401. In some embodiments, orchestration system 403 may include, may implement, or may be associated with the open-source Kubernetes® application programming interface ("API") or other suitable virtualization or containerization system.

As such, in some embodiments, one or more node groups 303 (e.g., node groups 303-1 and 303-5, in this example) may be implemented by a particular set of hardware resources 401. As discussed above, each node group 303 may include or may be associated with a respective migration assistant 305. As discussed below, each migration assistant 305 may be "aware" of and/or may otherwise be communicatively coupled to each node 103 of a corresponding node group 303. In some embodiments, migration assistant 305 may maintain authentication and/or authorization information associated with a corresponding node group 303, such as information indicating particular entities, clients 201, and/or other devices or systems that are authorized to request the migration of node group 303, as discussed below. Orchestration system 403 may, in some embodiments, maintain information associating particular node groups 303 with particular respective migration assistants 305. For example, orchestration system 403 may maintain an identifier, hostname, IP address, and/or other suitable information associated with each migration assistant 305 that is associated with each node group 303. Similarly, nodes 103 and/or migration assistants 305, installed at hardware resources 401 of cloud system 400, may maintain information indicating that orchestration system 403 is authorized to communicate with nodes 103 and/or migration assistants 305. For example, migration assistant 305 may maintain authentication and/or authorization information, based on which migration assistant 305 is able to authenticate requests from orchestration system 403 and verify that orchestration system 403 is authorized to issue such requests. As discussed below, such requests may include requests for distributed ledger information and/or world state information associated with a respective channel (e.g., distributed ledger) maintained by nodes 103 of node group 303. In this manner, orchestration system 403 may be able to communicate with respective migration assistants 305 that are associated with different node groups 303.

As noted above, each node group 303 may be associated with a respective channel (e.g., a particular distributed ledger). In some embodiments, orchestration system 403 may maintain data structure 405, which may indicate particular channels with which particular node groups 303 are associated. For example, data structure 405 may indicate that node group 303-1 is associated with Channel_A, and that node group 303-5 is associated with Channel_B. Orchestration system 403 may receive such information as part of a setup or configuration procedure associated with each respective node group 303. For example, orchestration system 403 may have received one or more instructions or other indications to create, instantiate, etc. node groups 303-1 and node group 303-5, where such instructions or indications include a channel identifier associated with the channels with which each respective node group 303 is associated. In some embodiments, data structure 405 may include additional or different information, such as an identifier of a particular distributed ledger management system with each channel or node group 303 is associated. In some embodiments, data structure 405 may include an identifier of node groups 303 associated with hardware resources 401, such as an identifier of node group 303-1 and an identifier of node group 303-5. In some embodiments, each node 103 and/or migration assistants 305 of each node group 303 maintain information indicating which channel each node 103 or node group 303 is associated.

In some embodiments, data structure 405 may include authentication and/or authorization information associated with each node group 303, such as information indicating particular entities, clients 201, and/or other devices or systems that are authorized to modify the configuration of nodes 103. Such modifications may include, for example, adding or removing nodes 103 from respective node groups 303, requesting particular hardware resource configurations for nodes 103 or node groups 303, requesting the migration of a particular node group 303 to another cloud system 400, etc.

Figure 5:
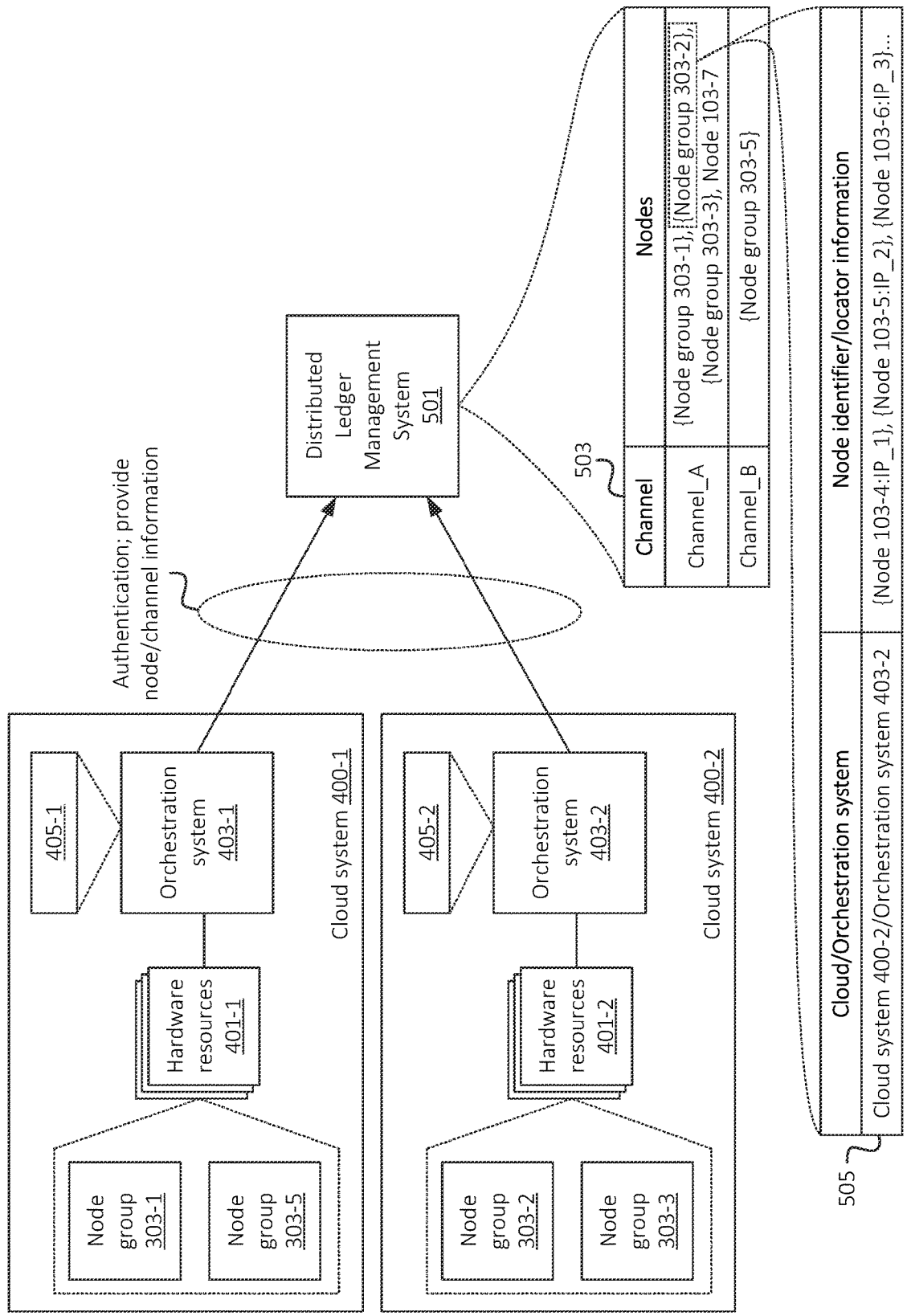
FIG. 5 illustrates an example of information that may be maintained by a distributed ledger management system, in accordance with some embodiments.

As shown in FIG. 5, multiple cloud systems 400 may implement multiple node groups 303 that are each associated with a respective channel. For example, cloud system 400-1 (e.g., hardware resources 401-1) may implement node groups 303-1 and 303-5, and cloud system 400-2 (e.g., hardware resources 401-2) may implement node groups 303-2 and 303-3. For example, a first entity may manage, control, provide, etc. cloud system 400-1, and a second entity may manage, control, provide, etc. cloud system 400-2. As similarly described above, each cloud system 400 may include a respective orchestration system 403. For example, cloud system 400-1 may include orchestration system 403-1, and cloud system 400-2 may include orchestration system 403-2. Orchestration systems 403-1 and 403-2 may maintain respective instances of data structure 405, such as data structures 405-1 and 405-2, respectively.

Distributed Ledger Management System ("DLMS") 501 may be, for example, associated with a distributed ledger framework, such as a Hyperledger® Fabric framework, a ConsenSys Software Inc.® Quorum® framework, an R3® Corda® framework, etc. DLMS 501 may manage one or more distributed ledgers (e.g., distributed ledger 101, distributed ledger 301, etc.), which may include establishing communications between respective nodes 103 that implement or maintain such distributed ledgers, assigning roles to particular nodes 103 (e.g., ordering node, peer, etc.), managing access to respective distributed ledgers (e.g., where one or more of such distributed ledgers may be "private" or "permissioned" distributed ledgers), serving as an interface between distributed ledgers and clients 201 or other external devices, or other suitable operations.

In accordance with some embodiments, respective orchestration systems 403 may perform or may participate in an authentication and/or authorization procedure with DLMS 501, in which DLMS 501 maintains information indicating that particular orchestration systems 403 and/or cloud systems 400 are associated with respective nodes 103 or node groups 303. DLMS 501 may also maintain information indicating which particular nodes 103 and/or node groups 303 are associated with which particular channels. DLMS 501 may receive some or all of the above-mentioned information from respective orchestration systems 403. In some embodiments, DLMS 501 may receive some or all of such information from migration assistants 305 associated with respective node groups 303. Additionally, or alternatively, DLMS 501 may receive some or all of such information from individual nodes 103 of node groups 303.

As shown, for example, DLMS 501 may maintain data structure 503, indicating particular node groups 303 and/or nodes 103 with which example Channel_A and Channel_B are associated. In some embodiments, for a given node 103, DLMS 501 may store information indicating which channel such node 103 is associated, as well as locator information for node 103 (e.g., an Internet Protocol ("IP") address, a Uniform Resource Locator ("URL"), a Uniform Resource Identifier ("URI"), and/or other suitable locator information). For example, data structure 503 may indicate that node 103-7 is associated with Channel_A, and may include an IP address associated with node 103-7.

Data structure 503 may also include information for particular nodes 103 that are associated with respective node groups 303. For example, data structure 503 may indicate that node group 303-2 is associated with Channel_A. Data structure 503 may further include, or may reference, data structure 505, which includes information regarding node group 303-2. Data structure 505 may include, for example, identifiers and/or locator information for particular nodes 103 of node group 303-2 (e.g., nodes 103-4, 103-5, 103-6, etc.). Data structure 505 may also include information indicating that node group 303-2 is associated with cloud system 400-2, orchestration system 403-2, and/or migration assistant 305-2. DLMS 501 may further maintain authentication information (e.g., one or more authentication tokens, cryptographic keys, passwords, etc.) that may be used by orchestration system 403-2, migration assistant 305-2, and/or other suitable device or system to perform one or more operations described below, such as requesting the migration of node group 303-2 (e.g., from cloud system 400-2 to another cloud system 400 or to another set of hardware resources 401).

Although data structures 503 and 505 are represented in a particular arrangement in FIG. 5, in practice, other arrangements may be used. For example, in some embodiments, DLMS 501 may maintain a "flat" data structure in which all nodes 103 associated with a given channel are indicated, including nodes 103 that are associated with respective node groups 303. This "flat" data structure may include, for each node 103, an indication of which cloud system 400, orchestration system 403, or migration assistant 305 each node 103 is associated (or may include a "null" value or other suitable indicator for nodes 103 that are not associated with a respective node group 303).

Figure 6:
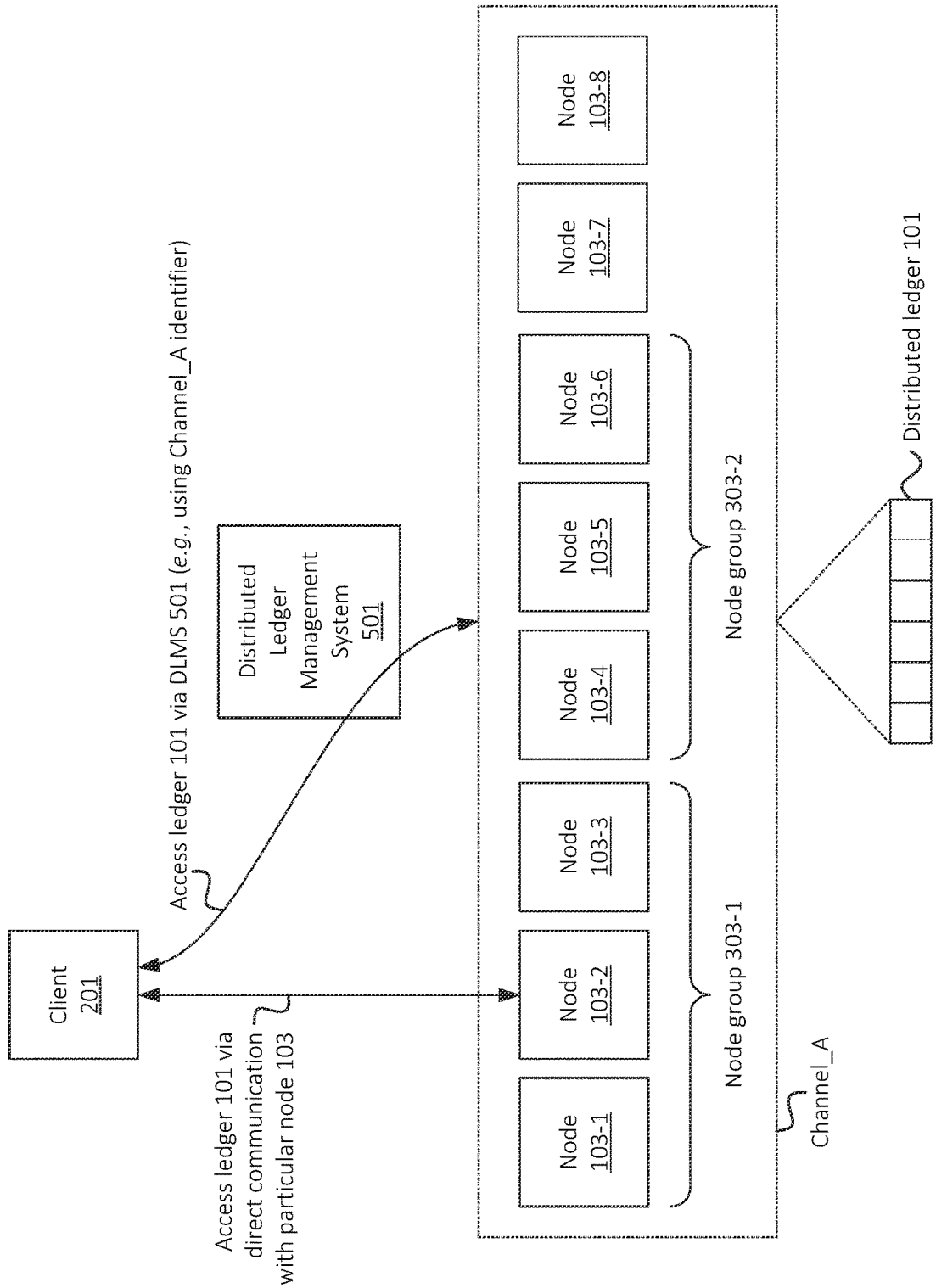
FIG. 6 illustrates an example representation of nodes that may maintain a distributed ledger associated with a particular channel, in accordance with some embodiments.

FIG. 6 illustrates an example of how a given client 201 may access respective nodes 103 of a given channel (i.e., Channel_A, in this example). As shown, client 201 may access distributed ledger 101 (e.g., with which Channel_A is associated) via direct communication with a particular node 103 of Channel_A. In this example, client 201 may communicate with node 103-2 to access distributed ledger 101, which may include requesting one or more records of distributed ledger 101, requesting world state information, requesting a recordation of data to distributed ledger 101, etc. Client 201 may have received or otherwise been configured with locator information associated with node 103-2, based on which client 201 may perform the direct communication. In some embodiments, node 103-2 may authenticate client 201 prior to allowing access.

As another example, client 201 (e.g., the same client 201 or a different client 201) may access distributed ledger 101 via DLMS 501. For example, client 201 may provide an identifier of distributed ledger 101 (e.g., an identifier of Channel_A and/or may otherwise indicate distributed ledger 101) when requesting access to information recorded to distributed ledger 101 and/or when requesting that new information be recorded to distributed ledger 101. DLMS 501 may, in some situations, authenticate client 201 and/or verify that client 201 is authorized to perform the requested actions. DLMS 501 may select a particular node 103 to which to provide the request, and may route, forward, etc. the request to the selected node 103. Further, DLMS 501 may receive a response to the request (e.g., requested data from distributed ledger 101 and/or a confirmation of a recordation of data to distributed ledger 101), and may provide such response to client 201. As shown, although some different nodes 103 are associated with different node groups 303 (e.g., implemented at different cloud systems 400), the operation of distributed ledger 101 may be independent of the arrangement of nodes 103 (e.g., may be independent of with which node group 303 nodes 103 are associated, or whether nodes 103 are associated any node group 303 at all).

FIGS. 7-12 illustrate an example migration of a particular node group 303, such as from a source cloud system 400 to a target cloud system 400. Such a scenario may be reflected when, for example, a particular entity desires to upgrade hardware resources on which node group 303 is implemented, desires to move node group 303 from leased hardware to proprietary hardware, and/or in other situations. In the examples of FIGS. 7-11, one or more orchestration systems 403 and migration assistants 305 are described as performing certain operations. In some embodiments, a particular orchestration system 403 may perform some or all of the operations described with respect to orchestration system 403 and a corresponding migration assistant 305 (e.g., a particular migration assistant 305 that is implemented at a set of hardware resources 401 configured by orchestration system 403), and/or a particular migration assistant 305 may perform some or all of the operations described with respect to a corresponding orchestration system 403.

Figure 7:
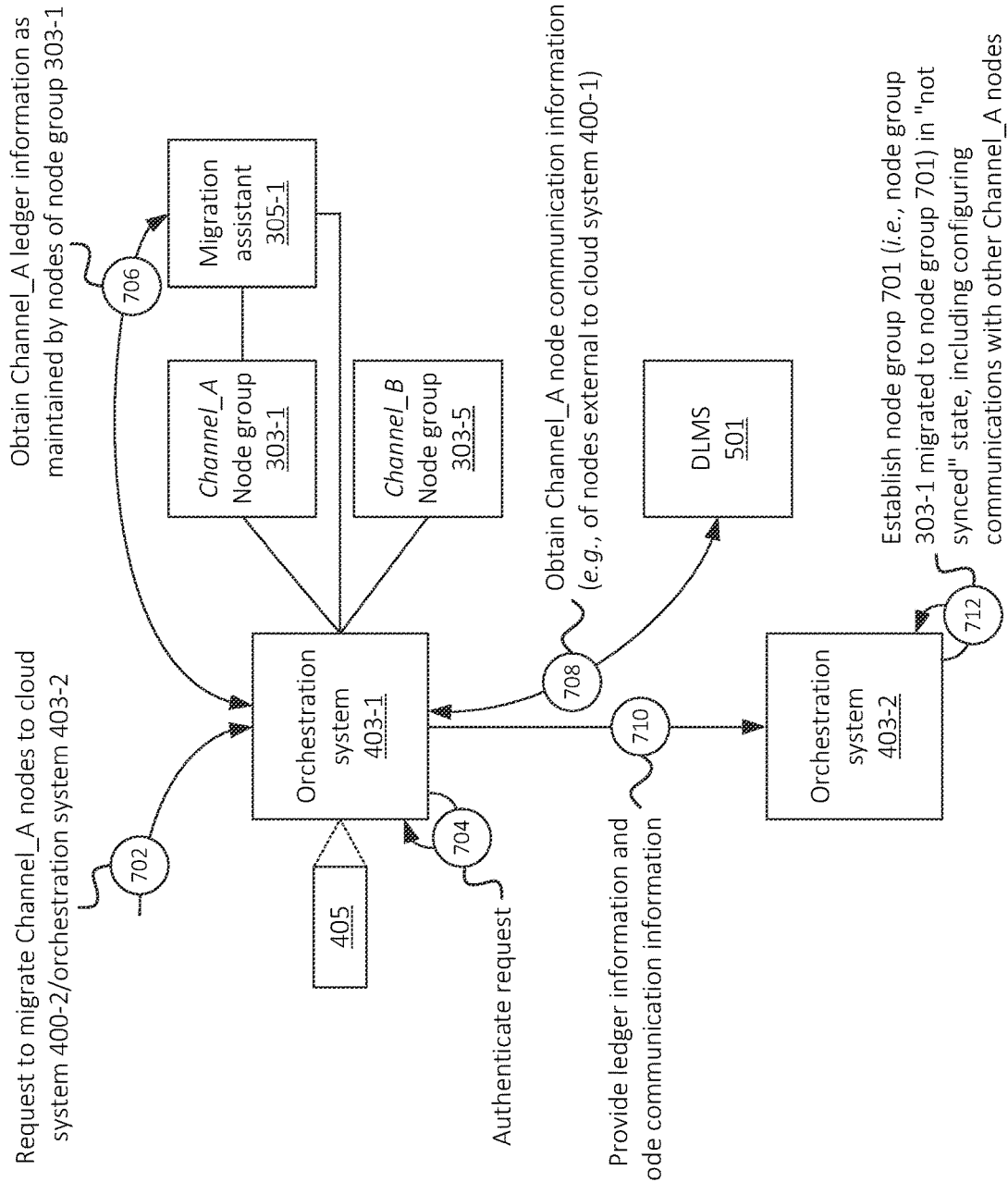
FIGS. 7-12 illustrate an example migration of a group of nodes, that maintain a distributed ledger, from a source node environment to a target node environment, in accordance with some embodiments.

As shown in FIG. 7, orchestration system 403-1 may receive (at 702) a request to migrate nodes associated with Channel_A from source cloud system 400-1 to target cloud system 400-2. In some embodiments, the request may include an IP address or other locator information associated with cloud system 400-2 and/or orchestration system 403-2 that configures hardware resources 401-2 of cloud system 400-2. The request may include an identifier of the requested channel (i.e., Channel_A) in this example, and/or may otherwise specify a particular node group (i.e., node group 303-1, in this example). In some embodiments, orchestration system 403-1 may identify the particular node group 303-1 based on a channel identifier as well as an identifier of the requesting device or system (e.g., based on data structure 405 maintained by 403-1). For example, in scenarios where cloud system 400-1 includes multiple node groups 303 associated with the same channel, orchestration system 403-1 may identify the particular node group 303-1 based on identifying that node group 303-1 is associated with the requested channel as well as the device or system issuing the request.

The request may be received (at 702) from client 201 and/or some other suitable device or system. The request may be received via an API, a web portal, or other suitable communication pathway between orchestration system 403-1 and the requesting device or system. Orchestration system 403-1 may authenticate (at 704) the request, which may include performing an authentication procedure with the requesting device or system, verifying authentication information included in the request (e.g., one or more authentication tokens, cryptographic keys, passwords, etc.), and/or otherwise authenticating the request. Orchestration system 403-1 may further verify that the request was received from an authorized source, such as by verifying a device identifier, username, or other suitable identifier of the requesting device or system. Orchestration system 403-1 may utilize information maintained in data structure 405, as discussed above, to authenticate and/or verify the request, and/or may utilize other suitable techniques to authenticate and/or verify the request.

In some embodiments, orchestration system 403-1 may automatically determine that node group 303-1 should be migrated to orchestration system 403-2 (e.g., in the absence of an explicit request). For example, orchestration system 403-1 may make such determination based on a set of rules or policies (e.g., where such rules or policies may indicate that one or more node groups 303 should be migrated based on load metrics of cloud system 400-1 or other suitable factors). In some embodiments, orchestration system 403-1 may make such determination based on artificial intelligence/machine learning ("AI/ML") techniques or other suitable techniques.

Orchestration system 403-1 may further identify a particular migration assistant 305-1 associated with the requested node group 303-1. For example, as discussed above, orchestration system 403-1 may maintain information associating particular migration assistants 305 with particular node groups 303, and may identify that migration assistant 305-1 is associated with node group 303-1. Orchestration system 403 may request, from migration assistant 305-1 (at 706), Channel_A ledger information as maintained by nodes 103 of node group 303-1. For example, orchestration system 403-1 may request world state information and/or may request a partial or complete copy of distributed ledger 101, with which Channel_A is associated. Migration assistant 305-1 may obtain such information from one or more nodes 103 of node group 303-1, and/or may access locally cached information (e.g., in embodiments where migration assistant 305-1 maintains an up-to-date copy of the world state information and/or of distributed ledger 101 itself). Migration assistant 305-1 may accordingly provide (at 706) the requested Channel_A ledger information (e.g., the world state information and/or the partial or complete copy of distributed ledger 101).

Orchestration system 403-1 may additionally obtain (at 708) node communication information, for Channel_A, from DLMS 501. Such communication information may include IP addresses or other locator information of some or all nodes 103 that are associated with Channel_A (e.g., as maintained by DLMS 501 in data structures 503 and/or 505). Once obtained (at 708), orchestration system 403-1 may have received an up-to-date copy of distributed ledger 101 (and/or a world state thereof), as well as communication information for other nodes 103 that maintain distributed ledger 101.

Orchestration system 403-1 may accordingly provide (at 710) the ledger information (obtained at 706) and the node communication information (obtained at 708) to target orchestration system 403-2, which was indicated in the request (at 702). Although the request is shown as being forwarded from orchestration system 403-1 to orchestration system 403-2, in some embodiments orchestration system 403-1 may provide the ledger information and node communication information to the requesting device or system, which may issue the request (at 710) to orchestration system 403-2. In this manner, orchestration system 403-2 may receive (at 712) a request to install a particular set of nodes 103 (e.g., nodes 103 of node group 303-1), and may receive an indication that such nodes 103 are associated with Channel_A as maintained by DLMS 501. In some embodiments, the request may specify, and/or orchestration system 403-2 may otherwise determine, that the requested nodes 103 should be installed as part of a new node group 701, which may include its own respective migration assistant (e.g., migration assistant 801, as discussed below).

In some embodiments, orchestration system 403-1 may provide, and/or orchestration system 403-2 may otherwise receive (at 710), information indicating a configuration of hardware resources 401-1 used to implement nodes 103 and/or migration assistant 305-1 of node group 303-1. For example, such information may indicate storage resources, processor resources, etc. used to implement such nodes 103 and/or migration assistant 305-1. Additionally, or alternatively, orchestration system 403-2 may receive or determine such configuration information independently of the configuration at source cloud system 400-1, such as in situations where the configuration of node group 701 includes upgrading or otherwise modifying the hardware resources used to implement node group 701.

Figure 8:
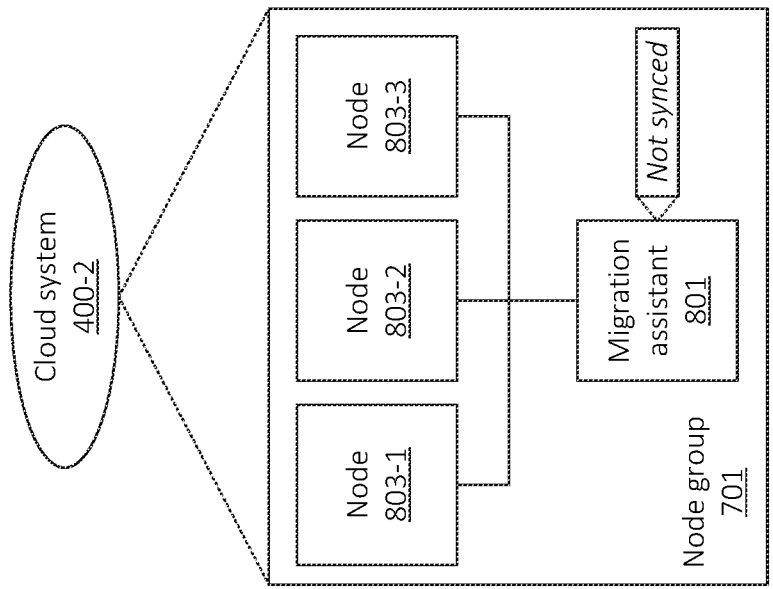
Figure 8:
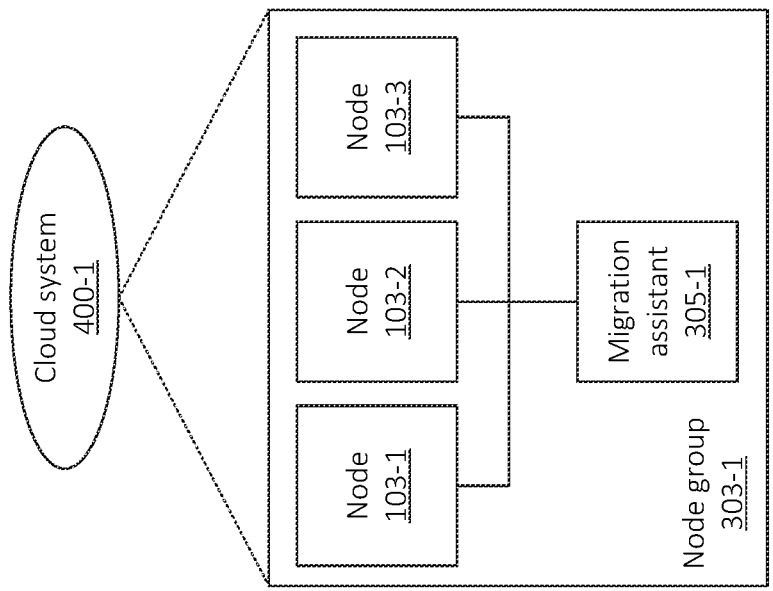

In some embodiments, based on the installation, instantiation, configuration, etc. of node group 701, orchestration system 403-2 may provide the ledger information, provided (at 706) by migration assistant 305-1, to node group 701 (e.g., to individual nodes of node group 701 and/or to migration assistant 801 of node group 701). Additionally, orchestration system 403-2 may provide the node communication information, provided (at 708) by DLMS 501, to node group 701. In this manner, as shown in FIG. 8, node group 701 may be a logical copy of node group 303-1, inasmuch as the same quantities, types, etc. of nodes 803 (e.g., nodes 803-1 through 803-3) may be installed at node group 701 of target cloud system 400-2 as are installed at node group 303-1 of source cloud system 400-1. Further, node group 701 may be "aware" of the other nodes 103 of Channel_A, by way of the provided node communication information. As further shown, based on the initial configuration of node group 701 (e.g., the instantiation of nodes 803-1 through 803-3 and/or migration assistant 801), migration assistant 801 may maintain information indicating that node group 701 is a particular state, such as a "not synced" state. The "not synced" state may reflect the possibility that additional ledger interactions (e.g., additions to distributed ledger 101) have occurred after node group 701 has been created, but before other nodes 103 that maintain distributed ledger 101 (e.g., other Channel_A nodes 103) have received communication information for nodes 803. In some embodiments, migration assistant 801 may propagate the "not synced" indicator to nodes 803, such as when nodes 803 are initially instantiated (e.g., the "not synced" indicator may be a default value associated with nodes 803), or nodes 803 may otherwise determine that node group 701 is in the "not synced" state.

Figure 9:
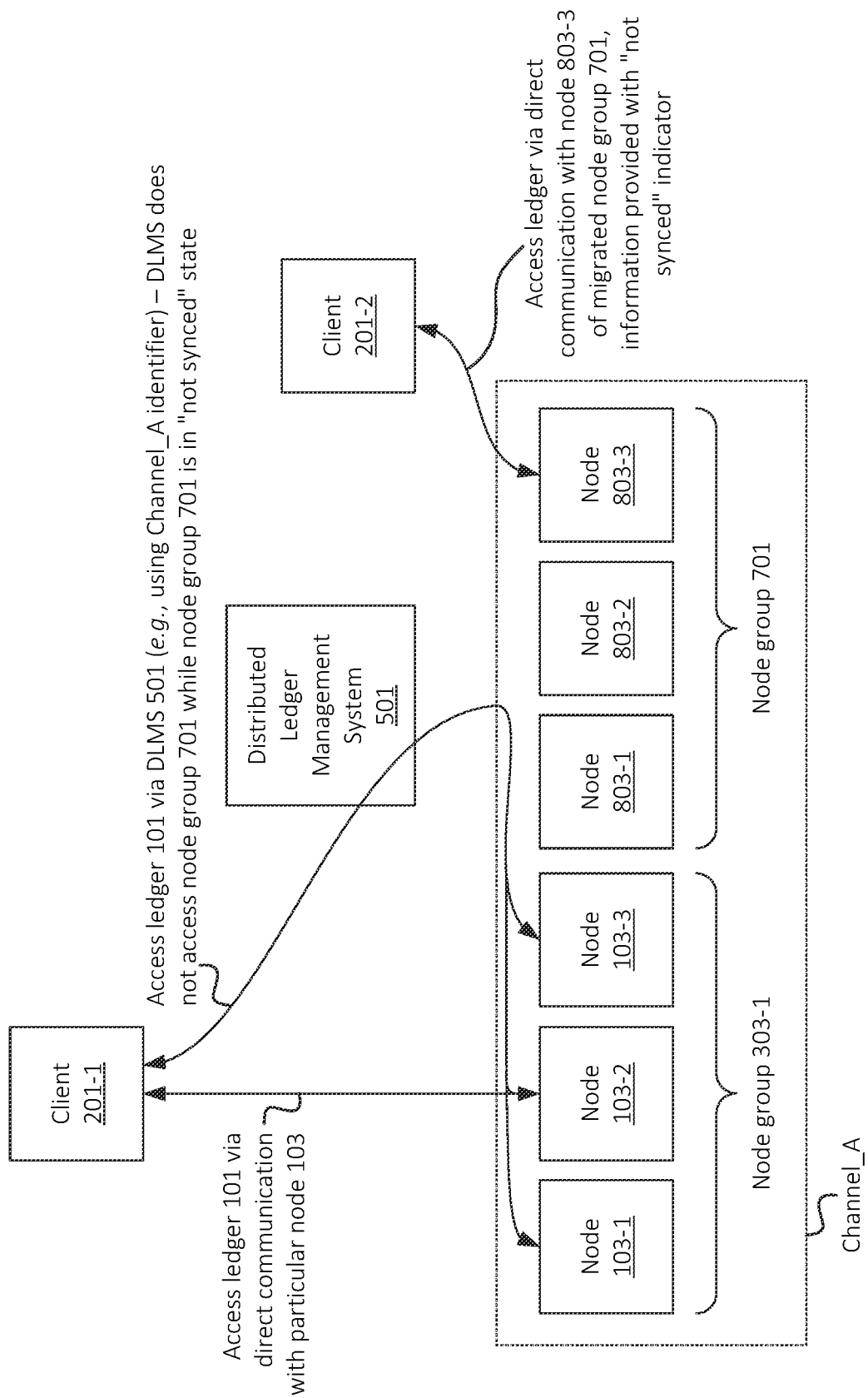

FIG. 9 illustrates an example situation in which node group 701 has been created, but other nodes 103 of Channel_A (and/or DLMS 501) have not yet received communication information for nodes 803 of node group 701. As shown, similar to the example of FIG. 4, a particular client 201-1 may directly access distributed ledger 101 via node 103-2, which may be included in node group 303-1 which has been migrated. That is, at this time, the source node group 303-1 may still be in operation, and may still receive access requests, ledger recordation requests, etc., and may perform suitable operations in response to such requests (e.g., authenticate the requests, provide requested information, propose or record additional ledger data, etc.). Further, as similarly discussed above, client 201-1 may communicate with DLMS 501 to request access or modifications to distributed ledger 101. In this situation, DLMS 501 may not yet have received communication information for newly created (e.g., migrated) node group 701, and may therefore route such requests to nodes 103 of node group 303-1 (and/or other nodes 103 associated with Channel_A). That is, DLMS 501 may not have received communication information for nodes 803 of node group 701, and may accordingly not be able to request ledger interactions with nodes 803 of node group 701.

On the other hand, client 201-2 may have access to, or may otherwise be "aware" of one or more nodes 803 of node group 701. Client 201-2 may request a ledger interaction, such as a request for ledger information (e.g., world state information, a full copy of distributed ledger 101, etc.). Node 803-3 may, in some embodiments, respond with the requested information, as well as an indicator that the information may be "not synced." Such indicator may be provided in the event that other ledger interactions have occurred (e.g., the example interactions between client 201-1 and distributed ledger 101 discussed above), and may serve as a notification to client 201-2 that it may be advisable to request such information from DLMS 501, or to request the information at a later time.

In some embodiments, client 201-2 may request, directly to node 803-3, that node 803-3 record new data to distributed ledger 101. In some embodiments, based on the "not synced" state of node group 701, node 803-3 may deny the request (e.g., may indicate to client 201-2 that node group 701 is "not synced" and therefore may have sync issues with distributed ledger 101 if node group 701 maintains a different copy of distributed ledger 101). Additionally, or alternatively, node 803-3 may forward the request to DLMS 501 and/or to one or more other nodes 103 of Channel_A, such that nodes 103 external to node group 701 are "aware" of the newly requested data and are able to add the data to distributed ledger 101.

Figure 10:
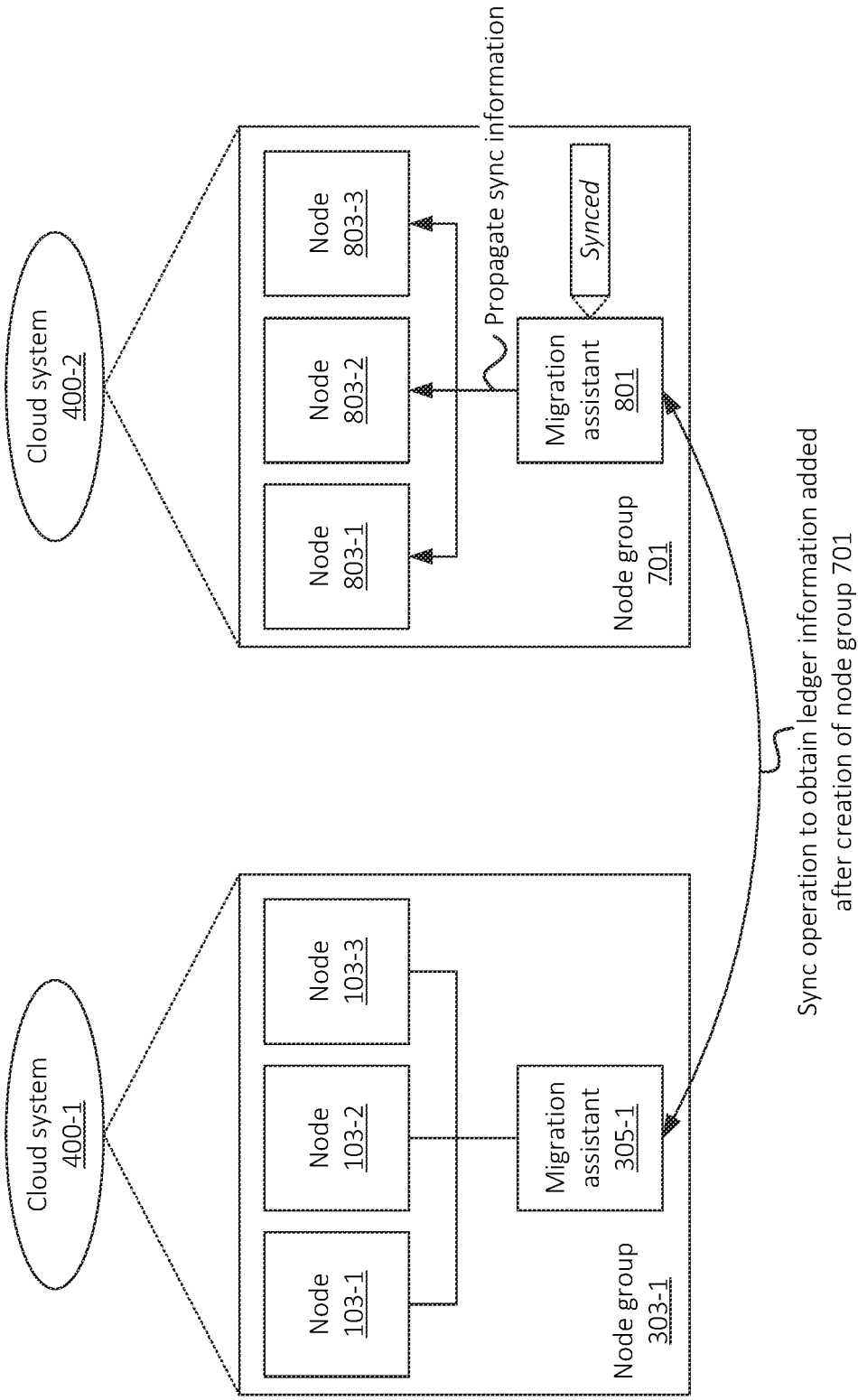

As shown in FIG. 10, after node group 701 has been created at cloud system 400-2 (e.g., after instantiation of nodes 803-1 through 803-3, including providing the ledger information and node communication information to nodes 803-1 through 803-3), migration assistant 801 may perform a sync operation with migration assistant 305-1 and/or one or more other nodes 103 of Channel_A. In this sync operation, migration assistant 801 may obtain a partial or complete up-to-date copy of distributed ledger 101, which may include ledger interactions that occurred after node group 701 was initially created. Migration assistant 801 may propagate the received ledger information to nodes 803-1 through 803-3. Additionally, or alternatively, nodes 803-1 through 803-3 may each communicate with migration assistant 305-1 and/or other nodes 103 (e.g., external to node group 701) to perform the sync operation. Migration assistant 801 and/or nodes 803-1 through 803-3 may, based on performing the sync operation, set node group 701 to a "synced" state and/or may otherwise remove the "not synced" indication associated with node group 701. Thus, when receiving requests for ledger information, nodes 803 of node group 701 may forgo providing a "not synced" indication.

Figure 11:
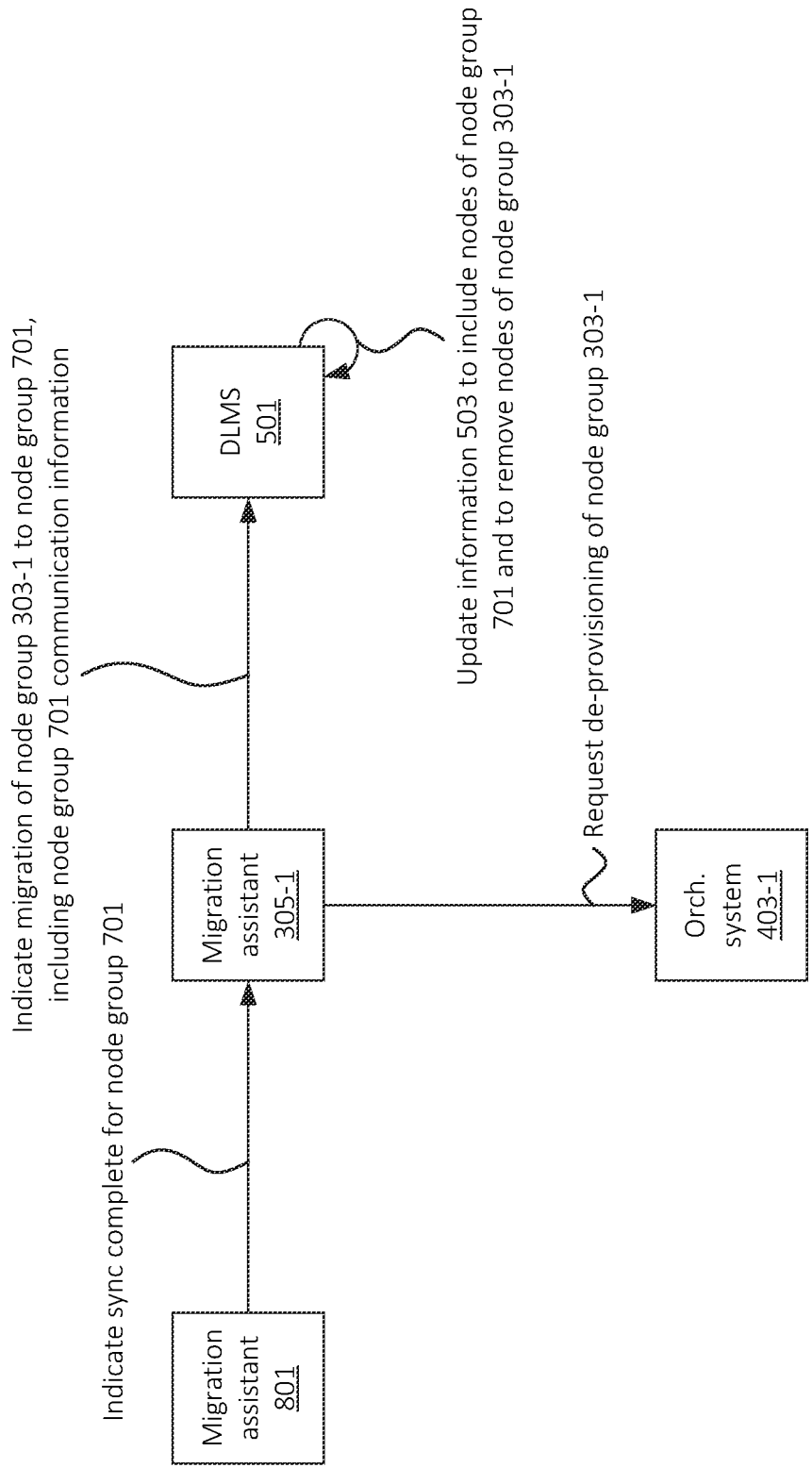
Figure 12:
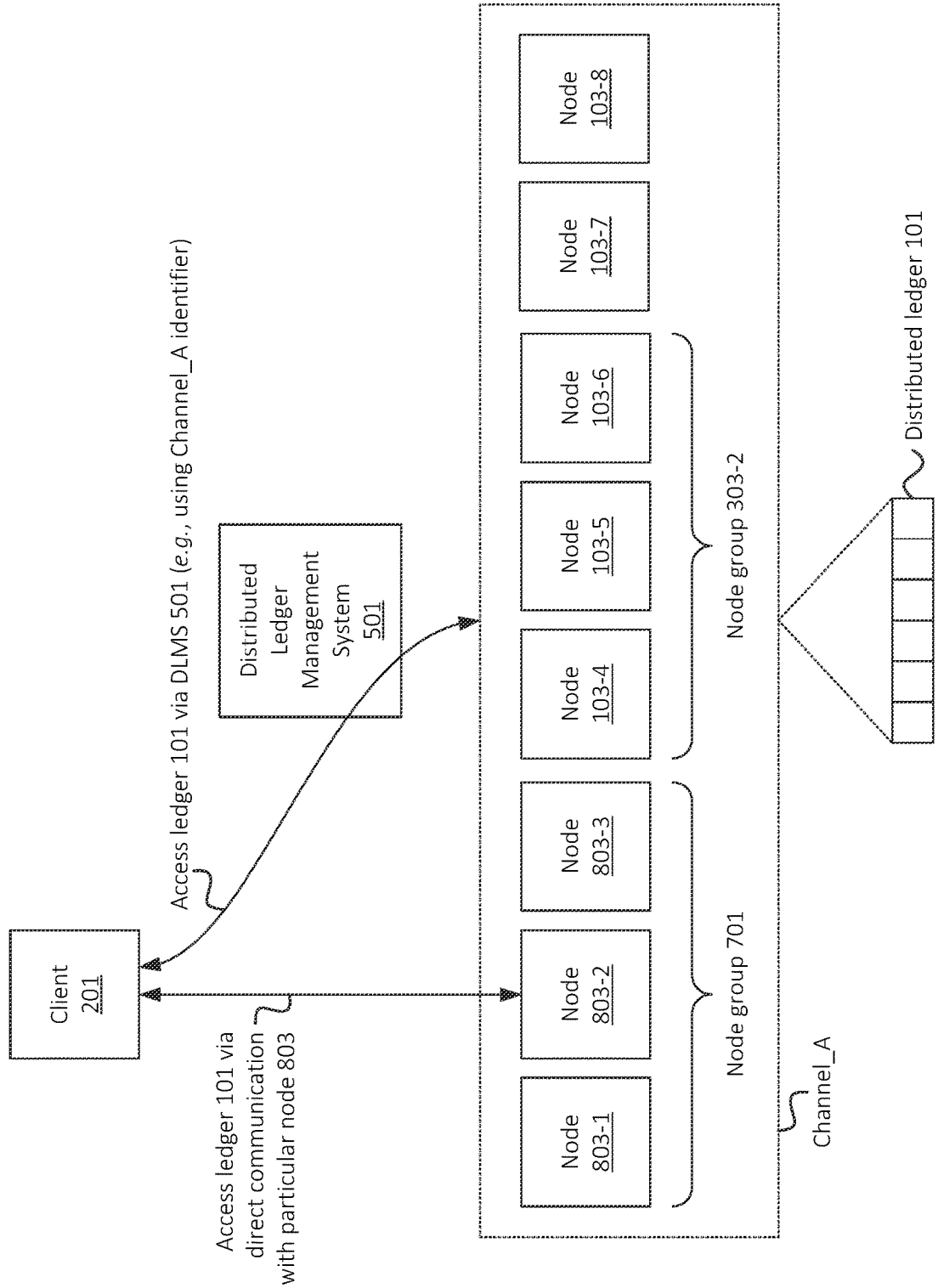

As shown in FIG. 11, prior to, or otherwise in conjunction with setting the state of node group 701 to "synced," migration assistant 801 may indicate, to migration assistant 305-1, that node group 701 has been synced (e.g., distributed ledger 101 as maintained by node group 701 is up-to-date with distributed ledger 101 as maintained by other nodes 103 of Channel_A). Such indication may include communication information for nodes 803, such as IP addresses or other locator information. Migration assistant 305-1 may indicate the migration of node group 303-1 to node group 701, which such indication signifies that DLMS 501 should remove nodes 103 of node group 303-1 and should add migration assistants 801 of node group 701 (e.g., that nodes 103 of node group 303-1 should be replaced with migration assistants 801 of node group 701). In other words, IP addresses, identifiers, or other suitable information of migration assistants 801 of node group 701 may replace corresponding IP addresses, identifiers, or other suitable information of nodes 103 of node group 303-1 in data structure 503 as maintained by DLMS 501. In some embodiments, DLMS 501 may propagate such information to some or all other nodes 103 of Channel_A, such that the other nodes 103 of Channel_A are able to communicate with migration assistants 801 of node group 701 (e.g., no longer attempt to communicate with nodes 103 of node group 303-1). Migration assistant 305-1 may also indicate, to orchestration system 403-1, that the migration of node group 303-1 is complete, based on which orchestration system 403-1 may de-provision, uninstall, or otherwise free up hardware resources that were used to implement node group 303-1 (which may include de-provisioning, uninstalling, etc. migration assistant 305-1 itself). At this point, as shown in FIG. 12, Channel_A may include nodes 803 of node group 701 (as well as one or more other nodes 103, as similarly shown in FIG. 6), and may no longer include nodes 103-1 through 103-3 of node group 303-1.

Figure 13:
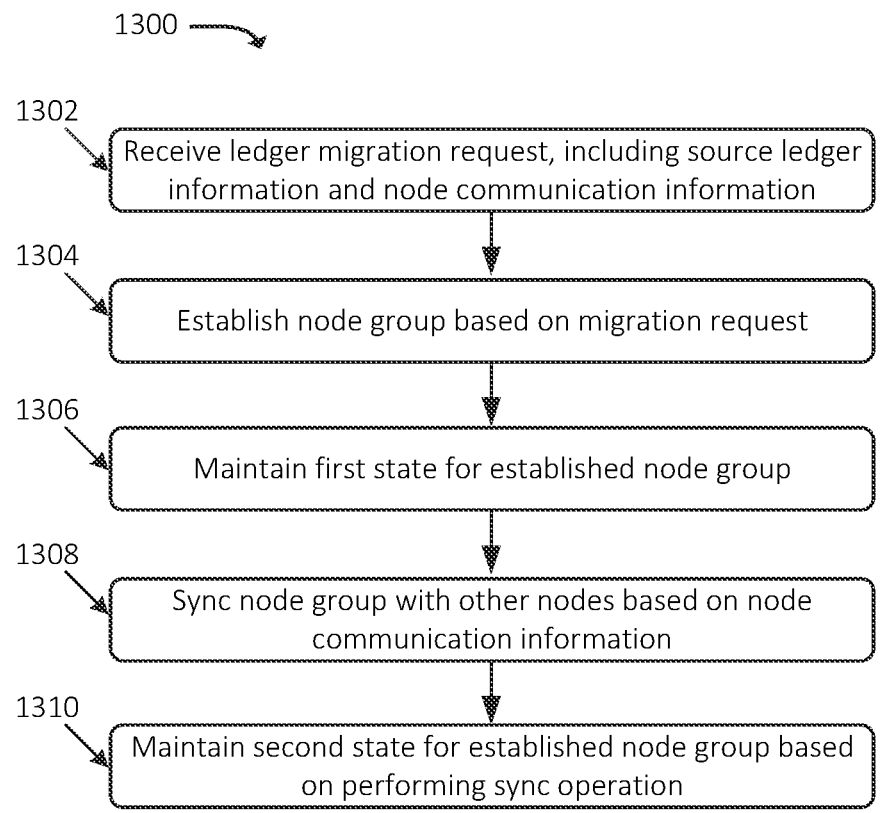
FIG. 13 illustrates an example process for migrating a group of nodes, that maintain a distributed ledger, from a source node environment to a target node environment, in accordance with some embodiments.

FIG. 13 illustrates an example process 1300 for migrating a group of nodes, that maintain a distributed ledger, from a source node environment (e.g., from cloud system 400-1 and/or a first set of hardware resources 401-1) to a target node environment (e.g., to cloud system 400-2 and/or a second set of hardware resources 401-2). In some embodiments, some or all of process 1300 may be performed by cloud system 400-2 and/or one or more elements thereof (e.g., orchestration system 403-2, migration assistant 801, etc.). In some embodiments, one or more other devices may perform some or all of process 1300 in concert with, and/or in lieu of, orchestration system 403-2 and/or migration assistant 801.

As shown, process 1300 may include receiving (at 1302) a ledger migration request, which may include source ledger information and node communication information. For example, as discussed above, the source ledger information may include information included in, or derived from, the contents of a particular distributed ledger 101 to be migrated (e.g., as maintained by source nodes 103 of a source node group 303). The communication information may include IP addresses and/or other locator information of some or all other nodes 103 that maintain the particular distributed ledger 101.

Process 1300 may further include establishing (at 1304) a new node group 701 based on the migration request. For example, node group 701 may be established, including a quantity and/or type of nodes 803 that may be determined based on the received node communication information (e.g., from DLMS 501), and/or may be based on information provided by source cloud system 400-1 (e.g., orchestration system 403-1 and/or migration assistant 305-1 associated with source node group 303). Establishing node group 701 may include providing the ledger information to nodes 803 of node group 701, such that nodes 803 maintain a local copy of distributed ledger 101 as received (at 1302). Nodes 803 may also maintain communication information for other nodes 103 that maintain distributed ledger 101, such that nodes 803 are able to communicate with such nodes 103 to maintain distributed ledger 101.

Process 1300 may additionally include maintaining (at 1306) a first state for the established node group 701. For example, as discussed above, nodes 803 and/or other one or more other elements of target cloud system 400-2 (e.g., migration assistant 801) may maintain information indicating that nodes 803 are in a "not synced" state, which may reflect the possibility that other nodes 103 that maintain distributed ledger 101 have received updates to distributed ledger 101 during a time period in which such other nodes 103 do not necessarily have communication information for newly established nodes 803. As discussed above, when providing ledger information (e.g., to client 201), nodes 803 may provide a notification that the provided ledger information may be out of sync, based on which a requestor may obtain the information from another node 103, from DLMS 501, and/or may wait some time before attempting to obtain the information again from node 803.

Process 1300 may also include syncing (at 1308) the established node group 701 with other nodes 103 based on the node communication information. For example, as discussed above, nodes 803 and/or one or more other elements of cloud system 400-2 (e.g., orchestration system 403-2, migration assistant 801, etc.) may communicate with source nodes 103 of source node group 303 and/or one or more other nodes 103 that maintain distributed ledger 101, in order to obtain up-to-date ledger information associated with distributed ledger 101 (e.g., which may have been received after nodes 803 were established).

Process 1300 may further include maintaining (at 1310) a second state for the established node group 701 based on performing the sync operation. For example, once synced, nodes 803 may maintain information indicating that nodes 803 are synced, up-to-date, etc. with other nodes 103 with respect to distributed ledger 101. Thus, when providing ledger information, nodes 803 may forgo indicating that the ledger information may be out of sync, and/or may provide an indication that such information is synced or otherwise valid. As discussed above, after the sync operation, other nodes 103 and/or DLMS 501 may be updated with communication information for nodes 803, and may, in some embodiments, remove communication information associated with source nodes 103 of node group 303. In this manner, source nodes 103 of node group 303 may essentially be replaced or migrated to nodes 803, without the possibility of desync issues.

Figure 14:
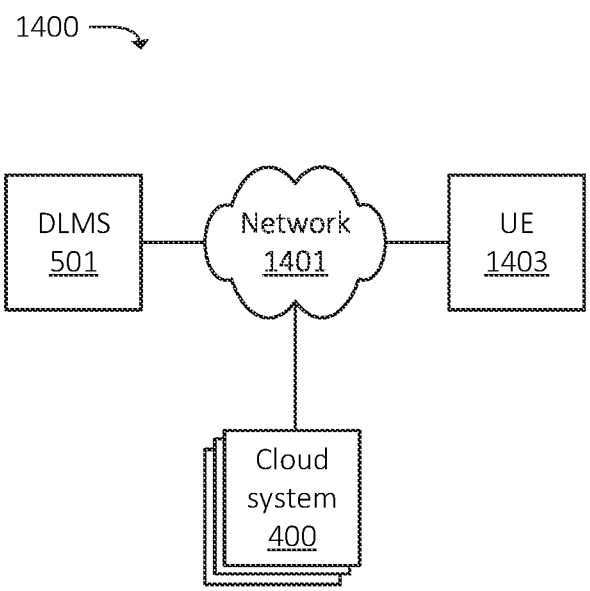
FIG. 14 illustrates an example environment in which one or more embodiments, described herein, may be implemented.

FIG. 14 illustrates an example environment 1400, in which one or more embodiments may be implemented. Environment 1400 may include network 1401, User Equipment ("UE") 1403, DLMS 501, one or more cloud systems 400, and/or one or more other devices, systems, or networks. In some embodiments, environment 1400 may include one or more additional devices or systems communicatively coupled to one or more networks (e.g., network 1401).

The quantity of devices and/or networks, illustrated in FIG. 14, is provided for explanatory purposes only. In practice, environment 1400 may include additional devices and/or networks, fewer devices and/or networks, different devices and/or networks, or differently arranged devices and/or networks than illustrated in FIG. 14. For example, while not shown, environment 1400 may include devices that facilitate or enable communication between various components shown in environment 1400, such as routers, modems, gateways, switches, hubs, etc. In some implementations, one or more devices of environment 1400 may be physically integrated in, and/or may be physically attached to, one or more other devices of environment 1400. Alternatively, or additionally, one or more of the devices of environment 1400 may perform one or more network functions described as being performed by another one or more of the devices of environment 1400. Elements of environment 1400 may interconnect with each other and/or other devices via wired connections, wireless connections, or a combination of wired and wireless connections. Some or all of the elements of environment 1400 may be implemented by one or more devices, sets of hardware resources, cloud systems, or the like.

Network 1401 may include one or more wired and/or wireless networks. For example, network 1401 may include an Internet Protocol ("IP")-based Packet Data Network ("PDN"), a wide area network ("WAN") such as the Internet, a private enterprise network, and/or one or more other networks. UE 1403 may communicate, through network 1401, with data servers, other UEs 1403, and/or to other servers or applications that are coupled to network 1401. Network 1401 may be connected to one or more other networks, such as a public switched telephone network ("PSTN"), a public land mobile network ("PLMN"), and/or another network. Network 1401 may be connected to one or more devices, such as content providers, applications, web servers, and/or other devices, with which UE 1403 may communicate.

UE 1403 may include a computation and communication device, such as a wireless mobile communication device that is capable of communicating with network 1401. UE 1403 may communicate with network 1401 via a wired or a wireless interface, such as via one or more radio access network ("RANs"), such as a Fifth Generation ("5G") RAN, a Long-Term Evolution ("LTE") RAN, etc. UE 1403 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), a Fixed Wireless Access ("FWA") device, or another type of mobile computation and communication device. In some embodiments, one or more nodes 103, clients 201, etc. may include or may be implemented by one or more UEs 1403.

Figure 15:
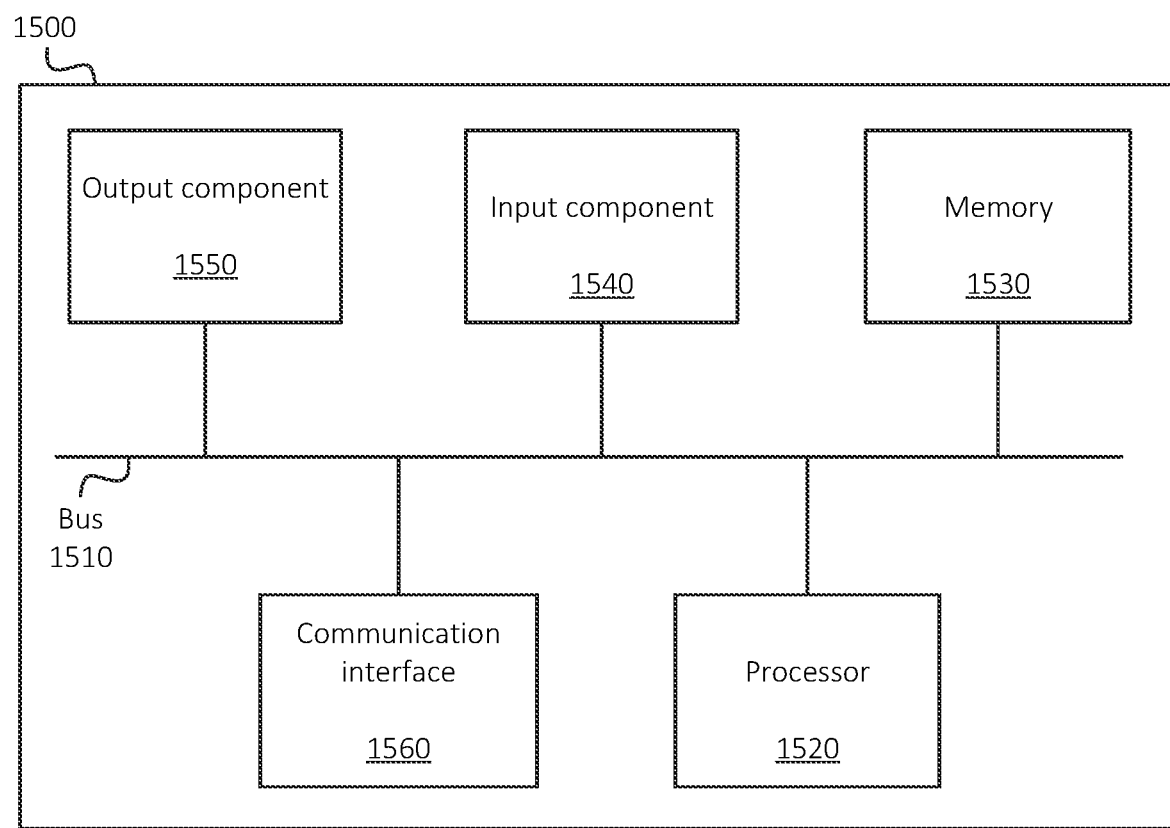
FIG. 15 illustrates example components of one or more devices, in accordance with one or more embodiments described herein.

FIG. 15 illustrates example components of device 1500. One or more of the devices described above may include one or more devices 1500. Device 1500 may include bus 1510, processor 1520, memory 1530, input component 1540, output component 1550, and communication interface 1560. In another implementation, device 1500 may include additional, fewer, different, or differently arranged components.

Bus 1510 may include one or more communication paths that permit communication among the components of device 1500. Processor 1520 may include a processor, microprocessor, or processing logic that may interpret and execute instructions (e.g., processor-executable instructions). In some embodiments, processor 1520 may be or may include one or more hardware processors. Memory 1530 may include any type of dynamic storage device that may store information and instructions for execution by processor 1520, and/or any type of non-volatile storage device that may store information for use by processor 1520.

Input component 1540 may include a mechanism that permits an operator to input information to device 1500 and/or other receives or detects input from a source external to input component 1540, such as a touchpad, a touchscreen, a keyboard, a keypad, a button, a switch, a microphone or other audio input component, etc. In some embodiments, input component 1540 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1550 may include a mechanism that outputs information to the operator, such as a display, a speaker, one or more light emitting diodes ("LEDs"), etc.

Communication interface 1560 may include any transceiver-like mechanism that enables device 1500 to communicate with other devices and/or systems. For example, communication interface 1560 may include an Ethernet interface, an optical interface, a coaxial interface, or the like. Communication interface 1560 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1500 may include more than one communication interface 1560. For instance, device 1500 may include an optical interface and an Ethernet interface.

Device 1500 may perform certain operations relating to one or more processes described above. Device 1500 may perform these operations in response to processor 1520 executing instructions, such as software instructions, processor-executable instructions, etc. stored in a computer-readable medium, such as memory 1530. A computer-readable medium may be defined as a non-transitory memory device. A memory device may include space within a single physical memory device or spread across multiple physical memory devices. The instructions may be read into memory 1530 from another computer-readable medium or from another device. The instructions stored in memory 1530 may be processor-executable instructions that cause processor 1520 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1, 2A, 2B, and 3-13), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. One or more devices, comprising:
one or more processors configured to:
  receive ledger information based on contents of a distributed ledger maintained by a first set of nodes;
  receive communication information associated with the first set of nodes;
  establish a second set of nodes, wherein establishing the second set of nodes includes:
    providing the ledger information to the second set of nodes,
    providing the communication information, associated with the first set of nodes, to the second set of nodes, and
    providing information to the second set of nodes indicating that the second set of nodes are in a first state, wherein the second set of nodes forwards, to the first set of nodes and based on the communication information associated with the first set of nodes, a first request to modify the distributed ledger based on the second set of nodes being in the first state;
  after establishing the second set of nodes, obtain sync information from the first set of nodes;
  provide the sync information to the second set of nodes; and
  based on providing the sync information to the second set of nodes, provide information to the second set of nodes indicating that the second set of nodes are in a second state, wherein the second set of nodes modify the distributed ledger in accordance with a second request to modify the distributed ledger, based on the second set of nodes being in the second state.

2. The one or more devices of claim 1, wherein the first state includes a state indicating that the second set of nodes is not synced with the first set of nodes, and wherein the second state includes a state indicating that the second set of nodes is synced with the first set of nodes.

3. The one or more devices of claim 1, wherein the sync information includes information recorded to the distributed ledger after the second set of nodes were established.

4. The one or more devices of claim 1, wherein establishing the second set of nodes further includes providing, to the first set of nodes, communication information of the second set of nodes.

5. The one or more devices of claim 1, wherein the first set of nodes are implemented at a first set of hardware resources, wherein establishing the second set of nodes includes implementing the second set of nodes at a second set of hardware resources that are separate from the first set of hardware resources.

6. The one or more devices of claim 5, wherein the first set of hardware resources is associated with a first cloud system, and wherein the second set of hardware resources is associated with a second cloud system.

7. The one or more devices of claim 1, wherein the ledger information includes at least one of:
   a world state associated with the distributed ledger, or
   a copy of the distributed ledger as maintained by the first set of nodes.

8. A non-transitory computer-readable medium, storing a plurality of processor-executable instructions to:
   receive ledger information based on contents of a distributed ledger maintained by a first set of nodes;
   receive communication information associated with the first set of nodes;
   establish a second set of nodes, wherein establishing the second set of nodes includes:
      providing the ledger information to the second set of nodes,
      providing the communication information, associated with the first set of nodes, to the second set of nodes, and
      providing information to the second set of nodes indicating that the second set of nodes are in a first state, wherein the second set of nodes forwards, to the first set of nodes and based on the communication information associated with the first set of nodes, a first request to modify the distributed ledger based on the second set of nodes being in the first state;
   after establishing the second set of nodes, obtain sync information from the first set of nodes;
   provide the sync information to the second set of nodes; and
   based on providing the sync information to the second set of nodes, provide information to the second set of nodes indicating that the second set of nodes are in a second state, wherein the second set of nodes modify the distributed ledger in accordance with a second request to modify the distributed ledger, based on the second set of nodes being in the second state.

9. The non-transitory computer-readable medium of claim 8, wherein the first state includes a state indicating that the second set of nodes is not synced with the first set of nodes, and wherein the second state includes a state indicating that the second set of nodes is synced with the first set of nodes.

10. The non-transitory computer-readable medium of claim 8, wherein the sync information includes information recorded to the distributed ledger after the second set of nodes were established.

11. The non-transitory computer-readable medium of claim 8, wherein establishing the second set of nodes further includes providing, to the first set of nodes, communication information of the second set of nodes.

12. The non-transitory computer-readable medium of claim 8, wherein the first set of nodes are implemented at a first set of hardware resources, wherein establishing the second set of nodes includes implementing the second set of nodes at a second set of hardware resources that are separate from the first set of hardware resources.

13. The non-transitory computer-readable medium of claim 12, wherein the first set of hardware resources is associated with a first cloud system, and wherein the second set of hardware resources is associated with a second cloud system.

14. The non-transitory computer-readable medium of claim 8, wherein the ledger information includes at least one of:
   a world state associated with the distributed ledger, or
   a copy of the distributed ledger as maintained by the first set of nodes.

15. A method, comprising:
   receiving, by one or more devices, ledger information based on contents of a distributed ledger maintained by a first set of nodes;
   receiving, by the one or more devices, communication information associated with the first set of nodes;
   establishing, by the one or more devices, a second set of nodes, wherein establishing the second set of nodes includes:
      providing the ledger information to the second set of nodes,
      providing the communication information, associated with the first set of nodes, to the second set of nodes, and
      providing information to the second set of nodes indicating that the second set of nodes are in a first state, wherein the second set of nodes forwards, to the first set of nodes and based on the communication information associated with the first set of nodes, a first request to modify the distributed ledger based on the second set of nodes being in the first state;
   after establishing the second set of nodes, obtaining sync information from the first set of nodes;
   providing the sync information to the second set of nodes; and
   based on providing the sync information to the second set of nodes, providing information to the second set of nodes indicating that the second set of nodes are in a second state, wherein the second set of nodes modify the distributed ledger in accordance with a second request to modify the distributed ledger, based on the second set of nodes being in the second state.

16. The method of claim 15, wherein maintaining the information indicating that the second set of nodes are in the first state includes maintaining information indicating that the second set of nodes is not synced with the first set of nodes, and
   wherein maintaining the information indicating that the second set of nodes are in the second state includes maintaining information indicating that the second set of nodes is synced with the first set of nodes.

17. The method of claim 15, wherein the sync information includes information recorded to the distributed ledger after the second set of nodes were established.

18. The method of claim 15, wherein establishing the second set of nodes further includes providing, to the first set of nodes, communication information of the second set of nodes.

19. The method of claim 15, wherein the first set of nodes are implemented at a first set of hardware resources of a first cloud system, wherein establishing the second set of nodes includes implementing the second set of nodes at a second set of hardware resources of a second cloud system.

20. The method of claim 15, wherein the ledger information includes at least one of:
   a world state associated with the distributed ledger, or
   a copy of the distributed ledger as maintained by the first set of nodes.

\* \* \* \* \*